(12) United States Patent
Kameoka et al.

(10) Patent No.: US 7,194,546 B2
(45) Date of Patent: Mar. 20, 2007

(54) COMPUTER SYSTEM, A METHOD AND A PROGRAM FOR PROVIDING A WEB PAGE APPROPRIATE TO A USER

(75) Inventors: Michitada Kameoka, Saitama (JP); Keiji Takakura, Tokyo (JP); Masato Honjo, Tokyo (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 804 days.

(21) Appl. No.: 10/123,521

(22) Filed: Apr. 17, 2002

(65) Prior Publication Data
US 2002/0165940 A1    Nov. 7, 2002

(30) Foreign Application Priority Data
May 7, 2001    (JP)    ............................. 2001-136649

(51) Int. Cl.
G06F 15/16    (2006.01)
(52) U.S. Cl. ....................... 709/229; 709/232; 709/246
(58) Field of Classification Search ............... 709/229, 709/232, 246
See application file for complete search history.

(56) References Cited

U.S. PATENT DOCUMENTS

| | | | | |
|---|---|---|---|---|
| 5,878,223 A | * | 3/1999 | Becker et al. ............... | 709/223 |
| 5,950,200 A | * | 9/1999 | Sudai et al. .................. | 707/9 |
| 6,006,251 A | * | 12/1999 | Toyouchi et al. ........... | 709/203 |
| 6,009,410 A | * | 12/1999 | LeMole et al. ............... | 705/14 |
| 6,038,598 A | * | 3/2000 | Danneels ..................... | 709/219 |
| 6,044,376 A | * | 3/2000 | Kurtzman, II ............... | 707/102 |
| 6,115,709 A | * | 9/2000 | Gilmour et al. .............. | 707/9 |
| 6,119,098 A | * | 9/2000 | Guyot et al. ................. | 705/14 |
| 6,119,164 A | * | 9/2000 | Basche ....................... | 709/229 |
| 6,141,010 A | * | 10/2000 | Hoyle .......................... | 715/854 |
| 6,144,944 A | * | 11/2000 | Kurtzman et al. ............ | 705/14 |
| 6,154,783 A | * | 11/2000 | Gilmour et al. ............. | 709/245 |
| 6,182,116 B1 | * | 1/2001 | Namma et al. ............. | 709/204 |
| 6,236,975 B1 | * | 5/2001 | Boe et al. ....................... | 705/7 |
| 6,243,761 B1 | * | 6/2001 | Mogul et al. ................ | 709/246 |
| 6,330,592 B1 | * | 12/2001 | Makuch et al. ............. | 709/217 |
| 6,381,651 B1 | * | 4/2002 | Nishio et al. ................ | 709/245 |
| 6,385,641 B1 | * | 5/2002 | Jiang et al. .................. | 709/203 |
| 6,393,526 B1 | * | 5/2002 | Crow et al. .................. | 711/137 |
| 6,427,172 B1 | * | 7/2002 | Thacker et al. ............. | 709/235 |

(Continued)

FOREIGN PATENT DOCUMENTS

JP    9-101985    4/1997

(Continued)

*Primary Examiner*—Andrew Caldwell
*Assistant Examiner*—Stephan Willett
(74) *Attorney, Agent, or Firm*—Arent Fox PLLC

(57) ABSTRACT

The invention provides a computer system which is related with a Web server for providing a Web site over the Internet. The computer system is configured to comprise customer type determining means for determining a customer type of a user based on a transition of the user's content requests when the user is accessing the Web site and Web page providing means for providing an appropriate Web page for the user based on the determined customer type. According to the invention, it is possible to determine a customer type of a user while the user is accessing a Web site and present a Web page appropriate to that user based on the determined customer type of the user.

6 Claims, 8 Drawing Sheets

U.S. PATENT DOCUMENTS

| | | | |
|---|---|---|---|
| 6,438,578 B1* | 8/2002 | Schmid et al. | 709/203 |
| 6,438,579 B1* | 8/2002 | Hosken | 709/203 |
| 6,581,109 B1* | 6/2003 | Fields et al. | 709/246 |
| 6,584,498 B2* | 6/2003 | Nguyen | 709/219 |
| 6,742,033 B1* | 5/2004 | Smith et al. | 709/224 |
| 6,769,019 B2* | 7/2004 | Ferguson | 709/219 |
| 6,839,680 B1* | 1/2005 | Liu et al. | 705/10 |
| 6,839,705 B1* | 1/2005 | Grooters | 707/4 |

FOREIGN PATENT DOCUMENTS

| | | |
|---|---|---|
| JP | 9-245084 | 9/1997 |
| JP | 2886820 | 2/1999 |
| JP | 11-134353 | 5/1999 |
| JP | 11-282393 | 10/1999 |

* cited by examiner

COMPUTER SYSTEM, A METHOD AND A PROGRAM FOR PROVIDING A WEB PAGE APPROPRIATE TO A USER

BACKGROUND OF THE INVENTION

The present invention relates to a technique for introducing a user to appropriate information in a Web site, and more particularly, it relates to a technique for presenting to each user appropriate links which dynamically change according to each user.

Recently, Web sites which transmit company and/or product information to general customers through the Internet, have been prevailing widely. Such company Web sites contain more contents in comparison with Web sites of individual users. For example, company Web sites need to prepare such various contents as the latest information, various products information, dealer information, FAQ and so on. When a company tries to provide the customers with rich information through the Web site the company cannot avoid an increase in the amount of contents constituting the Web site.

Generally, a Web site which is massive in terms of the content amount, makes it difficult for the users to find out the information they want to know. As a result, the users cannot sometimes reach the information they really want to look for. Therefore, in order to introduce the users to the respective information, such Web sites having relatively many contents provide, for example, a form for searching Web sites or a menu on the top page.

The information introduction in such conventional Web sites depends primarily on users. Accordingly, users have to know in advance the terms or keywords related with the target information. Furthermore, when a user does not clearly identify the information that the user wants to know, it is not possible for the user to efficiently use such information introduction means.

Conventionally, needs of individual users have been analyzed based on access logs of the individual users. If such access log analysis for each user can be processed while the user is accessing the Web site, it is possible for the Web site to predict the information which is wanted by the user based on the result of such analysis so as to meet the need of each individual user.

Thus, it is required to determine a customer type for an individual user in a Web site and present an appropriate target to be linked, for that user, based on the determined customer type, so as to introduce the user to the appropriate information in the Web site.

SUMMARY OF THE INVENTION

In order to achieve the above-mentioned objective, the present invention provides a computer system which is related with a Web server for providing a Web site over the Internet. The computer system is configured to comprise customer type determining means for determining a customer type of a user based on a transition of the user's content requests when the user is accessing the Web site and Web page providing means for providing an appropriate Web page for the user based on the determined customer type.

According to the present invention, it is possible to determine a customer type of a user while the user is accessing a Web site and present a Web page appropriate to that user based on the determined customer type of the user.

According to an aspect of the invention, in the above-described computer system, the provided Web page is arranged to contain at least two frames on the browser screen, display the requested content in a first frame of the browser screen of the user and display a link to the appropriate Web page for the user in a second frame of the browser screen of the user.

According to this aspect of the invention, it is possible to introduce the user to the target content on the Web page because the content and the link are displayed as Web pages in the respective separate frames.

According to another aspect of the invention, in the above-described computer system, the provided Web page is arranged such that it is dynamically assigned to the link of the Web page which the user is accessing.

According to this aspect, the content appropriate to the user can be provided in the Web page based on the determined customer type.

DESCRIPTION OF THE PREFERRED EMBODIMENTS

Figure 1:
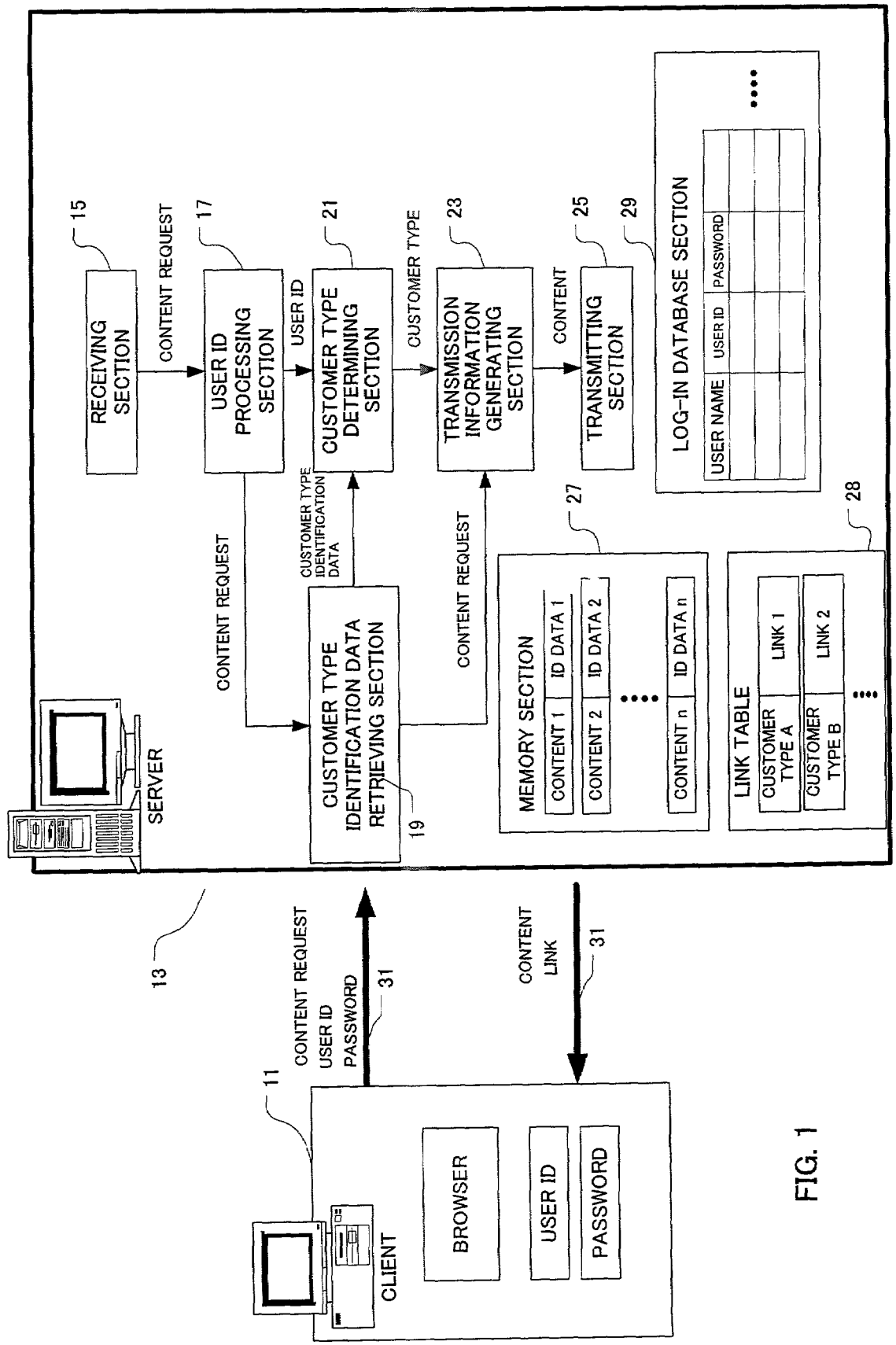
FIG. 1 shows an example of a Web server and client according to the invention.

Following will describe some embodiments of the invention with reference to the accompanying drawings. FIG. 1 shows an example of a Web server 13 and a PC (Web client) 11 according to the invention. A Web browser software is installed in the PC 11 for accessing a specified URL through the Internet 31.

FIG. 1 schematically shows the Web server 13 for providing a Web site of an ABC company. In the following description for this embodiment, the ABC company is specifically assumed to be an automobile manufacturing and marketing company. The server 13 has a URL for accepting an access via Internet and it is capable of providing a Web site of the ABC company to any Web client who exists on the Internet.

In an actual large-scale Web site, a Web server, a Web application server, a database server and other servers are interconnected with each other through a network so as to share the processes required for providing the Web site. In FIG. 1, all of those servers are integrated into the Web server 13.

Thus, the Web server may comprise one or more processors and one or more memories. The processors and memories may be interconnected with each other via such a network as a local area network.

Although only one PC 11 as a Web client is shown in FIG. 1, many Web clients actually exist over the Internet. Such many clients access the Web site and click a button, graphics or character in which a certain link is embedded. In response to such clicking operations, the Web server 13 provides the linked contents (which will be hereinafter referred to as "requested content") to the respective clients.

There are two types of pages provided in the Web site 13 of the ABC company. The first one is a page which anyone can access freely without the need for any user ID and password. The second one is a page for which each user is required to register in advance a user ID and its associated password. A user is allowed to access this type of page only after this user ID and the password are authenticated.

In order to register a user ID and a password, the user fills such items in an entry form on the Web site as the user's name, age, gender, family information, a residence type, annual income, information of the user's own car, stage of the car life and usage of the car, hobbies, car-driving stile etc., and then transmits the filled-in form. A CGI program of the Web server 13 verifies the received items in the entry form, approves the registration when the required items are recorded and then stores the user ID and the password in a database 29. In one embodiment, such obtained individual data of the potential customers may be transferred from the database 29 of the Web site to another database so as to be managed collectively with other individual data from the other sources.

When a user tries to access a page which requires authentication, the user transmits the user ID and the password from the PC 11 to the Web server 13. The Web server 13 checks the received user ID and password with the database 29, permits the log-in from the PC 11 if the authentication confirms the identity of the user, and provides each content in response to the content request.

Each page that can be accessed via the authentication of user IDs and passwords includes various contents such as the product information, service information, advertising information and the FAQ on the ABC company, in a hierarchical structure. Related contents are linked with one another either one-way or bi-directionally. The user can travel through the contents by means of clicking these links on the browser. Although all of the contents provided by the Web server 13 are stored collectively in a memory section 27 in FIG. 1, such structure is not necessarily required. Instead, the Web server 13 may manage each of the contents in a distributed structure.

The Web server 13 according to the present invention can determine in real time properties (customer type) of the user (visitor or customer) who is operating the PC 11 based on the content request from the PC 11. Furthermore, when a customer type has been determined, the Web server 13 can dynamically generate a link to the content corresponding to that customer type so as to present it to the PC 11.

A customer type, which is referred to in this embodiment, means a classification of customer's properties (such as preference, taste and tendency), which is statistically analyzed from the data of many customers. Examples of customer types include a type of actively reacting to the marketing activity (need for person dependency), a type of considering a test drive is important (need for confirmation of real product), a type of requesting the product information (need for information), a type of considering services for the product is important (need for services) and so on. Such customer types are predetermined based on the data of the questionnaire and/or the historical actual results in accordance with the method disclosed in the Japanese Patent Application No. 2000-396577 by the same applicant as for the present invention.

The Web server 13 can determine in real time the customer type of the user who is making an access, based on the user's request for the content and present a link to the target corresponding to the customer type. For example, when it is determined that the customer type of the user who is making an access is the type of considering a test drive is important (need for confirmation of real product), the Web server 13 generates a link to a content of "informing the schedule about the test drive for the new car" to present it to the user as a Web page. When the customer type of the user is determined to be the type of requesting the product information (need for information), the Web server 13 generates a link to a content of "providing information of new cars" to present it to the user as a Web page. In other words, the Web server 13 can dynamically provide the user with a link to the content having a strong influence on him or her, based on the customer type of the user who is making an access, so as to guide the user to reach the target content through the shortest path.

Real time determination of the customer type and dynamic editing of Web pages according to the present invention enable such guidance for the user during the access.

In FIG. 1, the processes of the Web server 13 are shown as functional blocks. Although the Web server 13 in FIG. 1 is configured to perform all of the processes, the invention is not limited to such configuration. For example, the Web server 13 and the PC 11 may share the processes shown in the functional blocks by means of using some cookie to be exchanged between the Web server 13 and the PC 11.

In the embodiment of FIG. 1, the Web server 13 comprises a receiving section 15, a user ID processing section 17, a customer type identification data retrieving section 19, a customer type determining section 21, a transmission information generating section 23 and a transmitting section 25 as well as a memory section 27 for storing the contents of the Web site and a log-in database section 29 for holding users' registration information (such as user names and the passwords).

The Web server 13 of FIG. 1 repeats a series of processes from the receiving section 15 through the transmitting section 25 every time a content request is received from the PC 11. Generally, the customer type of the user is identified as follows. A value included in the user ID of the user is updated after the user has requested for the contents several times. When the value included in the user ID satisfies a predetermined condition, a customer type is determined based on that value. When the customer type has been determined, a link corresponding to that customer type is obtained and the obtained link is transmitted to the PC 11 along with the content. A Web page containing the obtained link and the content is displayed on the browser screen of the PC 11. Following will describe in more detail the functional blocks shown in FIG. 1.

The receiving section 15 receives a request for the content that is transmitted by the PC 11 through the Internet 31. When the request for the content is received, the user ID processing section 17 consults the log-in database section 29 to obtain the user ID corresponding to the user who is making a content request. After having obtained the user ID, the content request is delivered to the customer type identification data retrieving section 19 and the obtained user ID is provided to the customer type determination section 21.

A user ID contains two kinds of information as described later in detail. The first piece of information contained in a user ID is a fixed value (numerical value or character) for uniquely distinguishing the user who is requesting the content. The second piece of information is a value (numerical value or character) used to determine a user's customer type, and this value is updated every time the content is requested by the user. The Web server 13 can determine a user's customer type based on the update of the second piece of information.

Upon receiving a content request, the customer type identification data retrieving section 19 retrieves the customer type identification data regarding the requested content and provides it to the customer type determining section 21. As described later in detail, the customer type identification data, containing coefficients for characterizing the user who is requesting the content, are used for determining the user's customer type.

The customer type determining section 21 uses the retrieved customer type identification data to update the user ID. The updated user ID is stored by the log-in database section 29 so as to be used at the time of the subsequent content request.

Besides, when the information contained in the updated user ID satisfies a predetermined condition, the customer type determining section 21 determines a customer type based on the updated user ID and informs the transmission information generating section 23 of the determined customer type. When the information contained in the updated user ID does not satisfy the predetermined condition, the transmission information generating section 23 is informed that the customer type is not determined.

The transmission information generating section 23 obtains the content corresponding to the user's content request from the memory section 27 as well as a link corresponding to the customer type that has been determined by the customer type determining section 21. For example, respective links corresponding to the customer types are stored beforehand in such table as a link table 28 shown in FIG. 1. When the customer type is not determined, a predetermined default link may be used. A transmitting section 25 transmits both of the content obtained from the memory section 27 and the obtained link to the PC 11 as transmission information. The PC 11 displays the transmission information containing the obtained link and content as a Web page on the browser screen.

Figure 2:
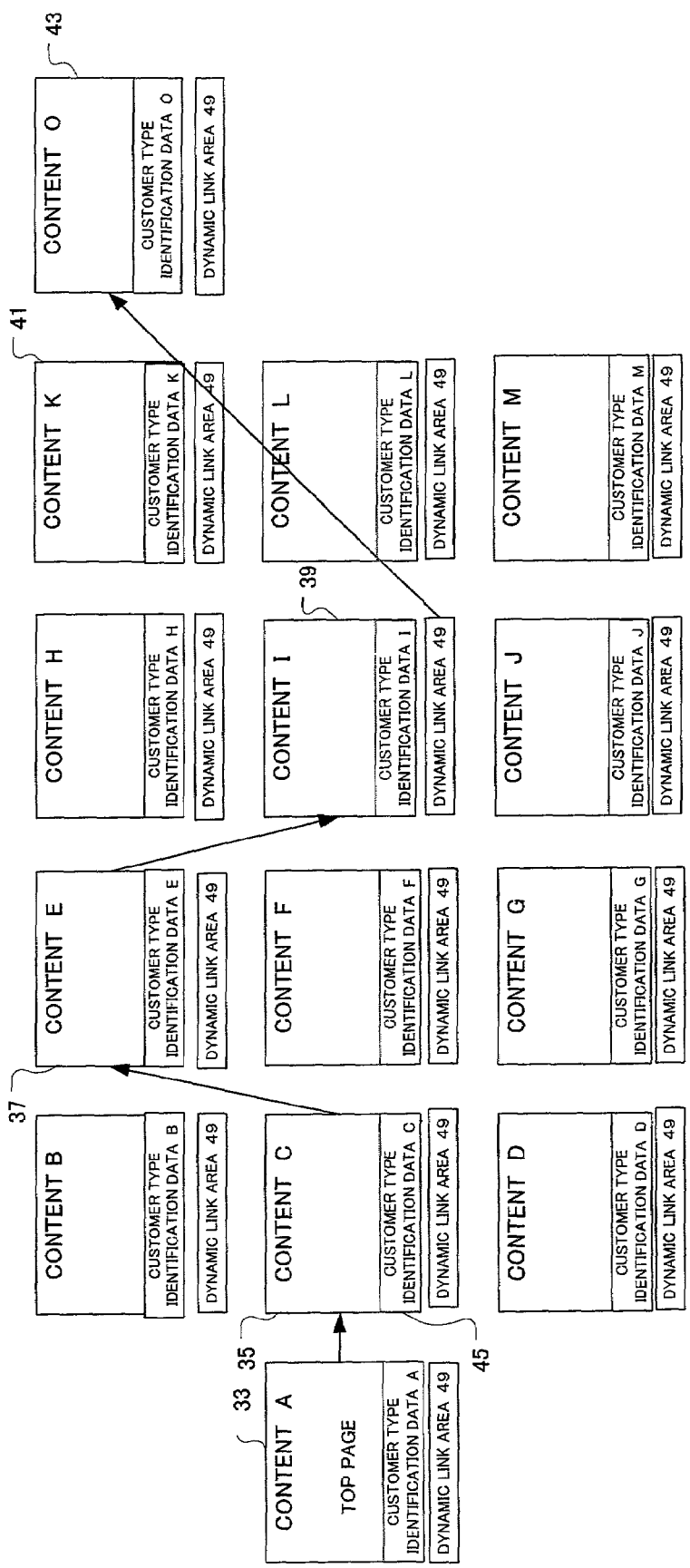
FIG. 2 shows an example of a Web site according to the invention.

Following will describe these processes in more detail. FIG. 2 shows a Web site comprising total fourteen contents according to the invention. For example, each content A through O is a HTML file which contains such information (texts, images and other objects) as product information and service information which is of significance to the users. Since some statically-embedded links (in other words, fixed links in HTML) are included in each content A to O, users can display the respective contents by means of clicking those links.

Besides, each content of the Web site according to the present invention is provided with the customer type identification data 45 respectively. As will be described later in more detail, the user's customer type can be determined in real time by means of referring to these customer type identification data 45 while the user is in access.

In the Web site of FIG. 2, a dynamic link area as well as each content is displayed on the browser screen of the PC 11. This dynamic link area is to present a link to the target corresponding to the customer type to the user when the user's customer type has been determined.

Figure 3:
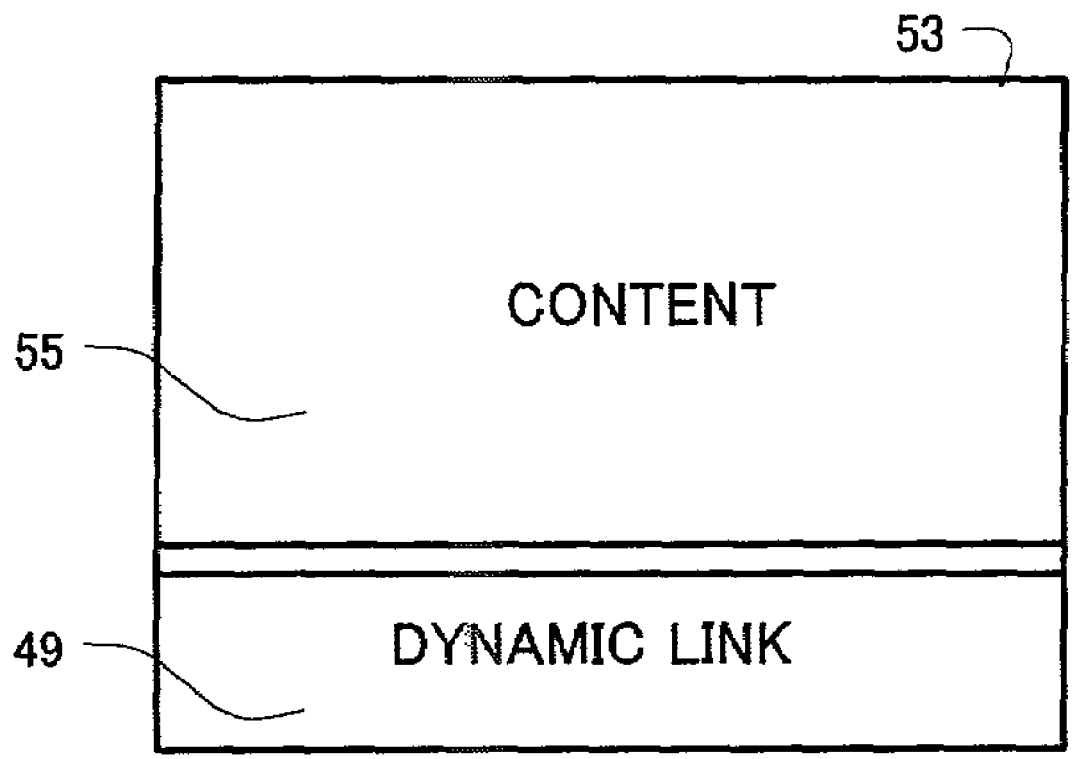
FIG. 3 shows an example of a browser screen which uses a frame function.

In one embodiment, the dynamic link area is implemented through a frame division scheme upon one browser screen. FIG. 3 shows an example of a browser screen 53, to be displayed in the PC 11, which uses a frame function. A browser screen 53 displays two frame areas for respectively displaying the corresponding HTML files.

A frame 55 is a static part to be used for displaying a content A to O as shown in FIG. 2. A frame 49 is a dynamic link area, in which a link to an arbitrary content and brief description (text, image or other object) about the linked target are displayed.

The link displayed in the frame 49 dynamically changes its target to be linked depending on whether or not the customer type of the user has been determined. More specifically, when the user's customer type is not determined, the frame 49 displays a predetermined default link. However, once the user's customer type has been determined based on the content requests, a link to the target corresponding to the user's customer type is displayed on the frame 49 instead of the predetermined default link.

Following will describe an exemplary operation of the dynamic link area 49 with reference to FIG. 2. This example assumes that the user's customer type is determined by the Web server 13 when the user clicks the link to the content I in the content E 37 during the user's travel through the path of "A to C to E to I to O".

What is displayed in the frame 55 of the browser screen 53 after the user has clicked the link from the content A 33 to the content C is the content C 35, and the predetermined default link is displayed in the frame 49. It is same at the time of the movement from the content C 35 to the content E 37.

However, because the user's customer type is determined after the link to the content I at the content E 37 has been clicked, the frame 49 of the browser screen 53 displays a link to the target corresponding to the user's customer type (the link to the content O in this example) rather than the default linked target. As a result, the content I 39 is displayed in the frame 55 of the browser screen 53 and the link to the content O is displayed in the frame 49. The user can reach the content O 43 through the shortest path by means of clicking the link to the content O which is being displayed in the frame 49.

Generally, the changed link to the target in the dynamic link area should be such content as having a strong influence on the user's customer type. For example, if a certain customer type is identified, the content that is wanted by that customer type can be predicted from the past statistics. Thus, convenience of the user could be enhanced because a link to the content that the user wants to see is presented in the dynamic link area 49.

The customer type of the user who is in access is determined based on the customer type identification data 45 associated with each content. The customer type identification data 45 contain respective numerical values for characterizing the users accessing each content. Those numerical values are assigned according to the customer types. In other words, the customer type identification data 45 for each content are the data for characterizing the customer type of the user who is accessing the concerned content.

Figure 4:
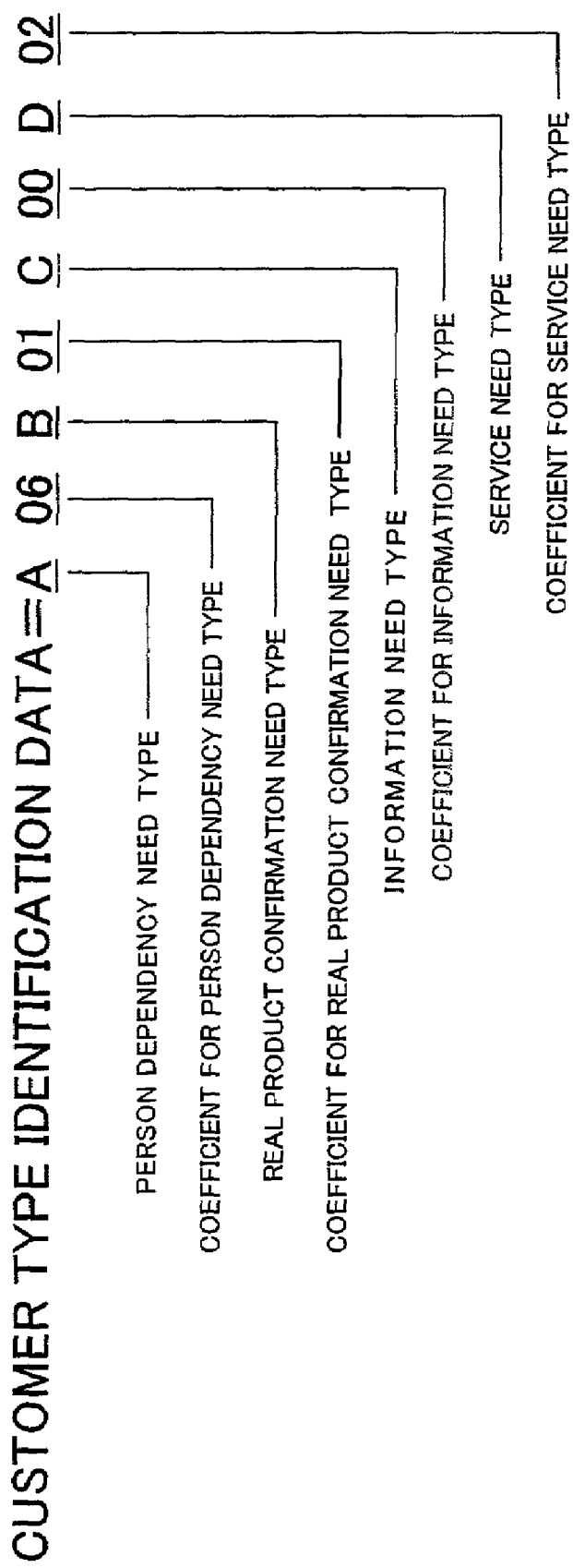
FIG. 4 shows an example of customer type identification data associated with each content.

FIG. 4 shows an example of the customer type identification data 45 associated with each content. This example uses the aforementioned four customer types, namely a type of "need for person dependency", a type of "need for confirmation of real product", a type of "need for information" and a type of "need for service". However, any number of customer types may be used depending on the requirement. When four customer types are used for the customer type identification data 45, users are classified into either of these four customer types.

The customer type identification data 45 include alphabetical characters (A to D), by which the customer types are respectively represented. In case of "A06B01C00D02" which is illustrated in FIG. 4, the character A represents the type of "need for person dependency", the character B represents the type of "need for confirmation of real product", the character C represents the type of "need for information" and the character D represents the type of "need for service".

Each numerical character following each alphabetical character in the customer type identification data 45 is a customer type coefficient representing a probability with which the user accessing a certain content falls within the customer type. Such coefficients are statistically determined for each content based on the past access logs for each content.

For example, when customer type coefficients "A06B01C00D02" are given to a certain content, the numerical values "06:01:00:02" following the alphabets indicate that the probabilities of the content for each customer type are "67%:11%:0%:22%" respectively. In other words, according to the past actual results, 67% of the users who have accessed the content belong to the customer type of "need for person dependency", 11% of the users belong to the customer type of "need for confirmation of real product" and 22% of the users belong to the customer type of "need for service".

As shown in FIG. 2, each content in the Web site according to the invention is associated with customer type identification data 45 varying from content to content. The Web server 13 determines in real time each user's customer type through use of the customer type identification data 45 for each content and the user ID.

Figure 5:
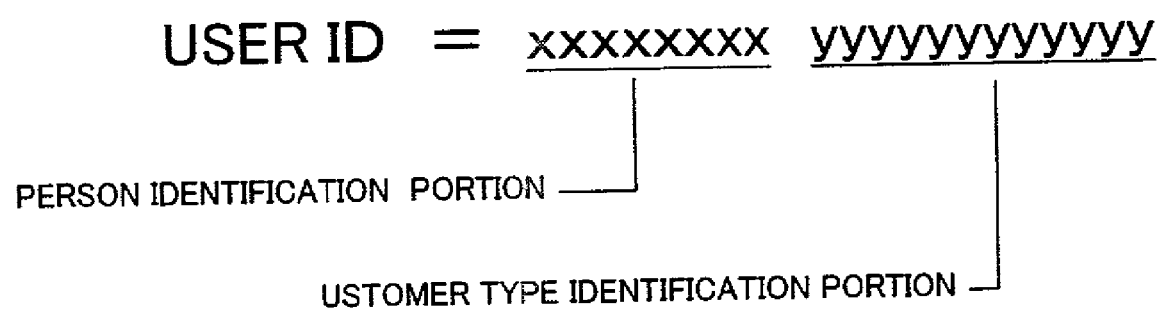
FIG. 5 shows an example of a user ID that contains a person identification portion and a customer type identification portion.

FIG. 5 shows one embodiment of the user ID which contains a person identification portion and a customer type identification portion. The person identification portion is used to hold a value (numerical value or character) for uniquely distinguishing the user. The customer type identification portion is used to determine the customer type of the user who is identified by the person identification portion. The value in the customer type identification portion is changed depending on the customer type identification data 45 for each content. The Web server 13 can determine the customer type from transition of the value of the customer type identification portion contained in the user ID.

Figure 6:
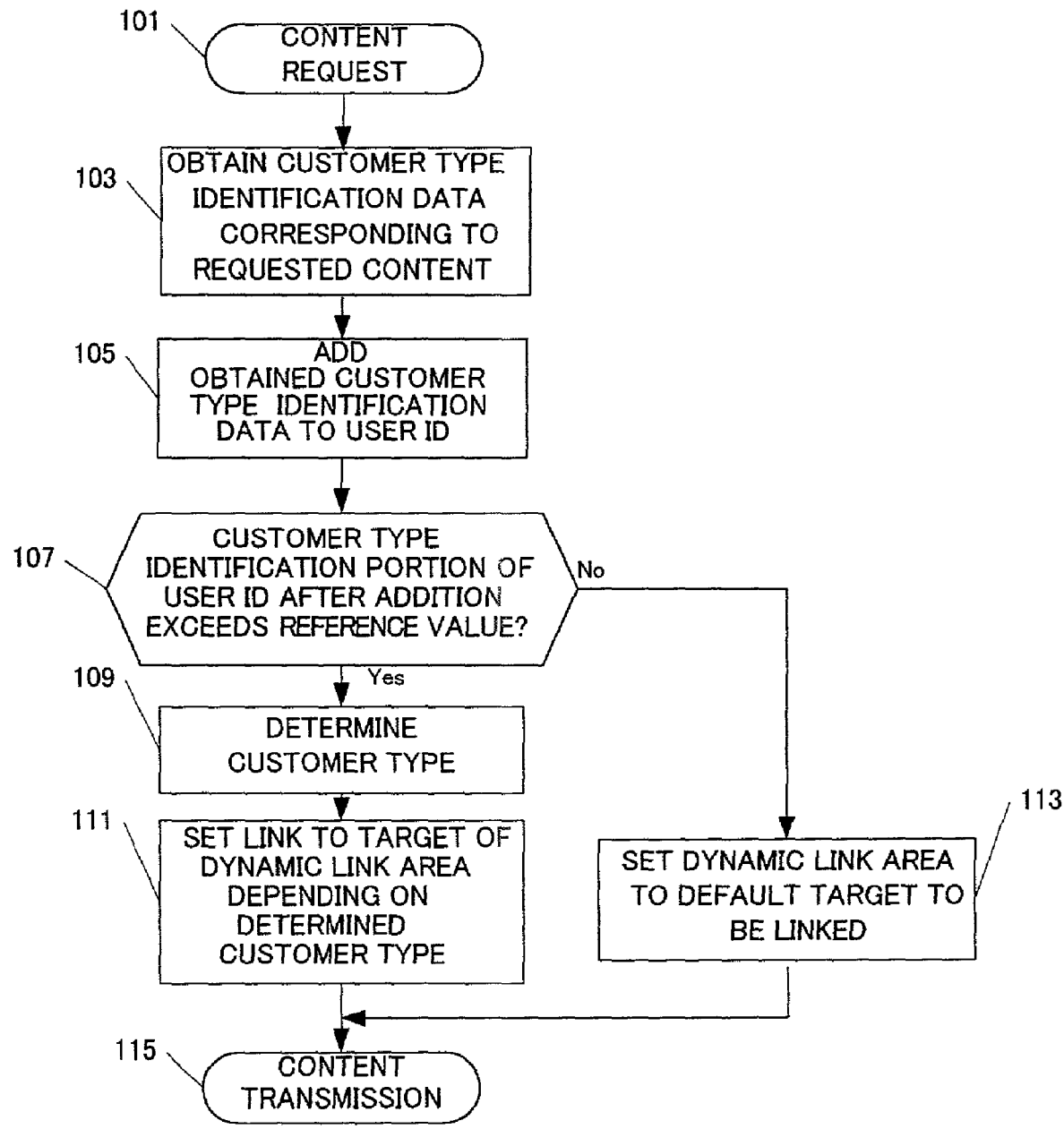
FIG. 6 is a flowchart showing a process of the Web server.
Figure 7:
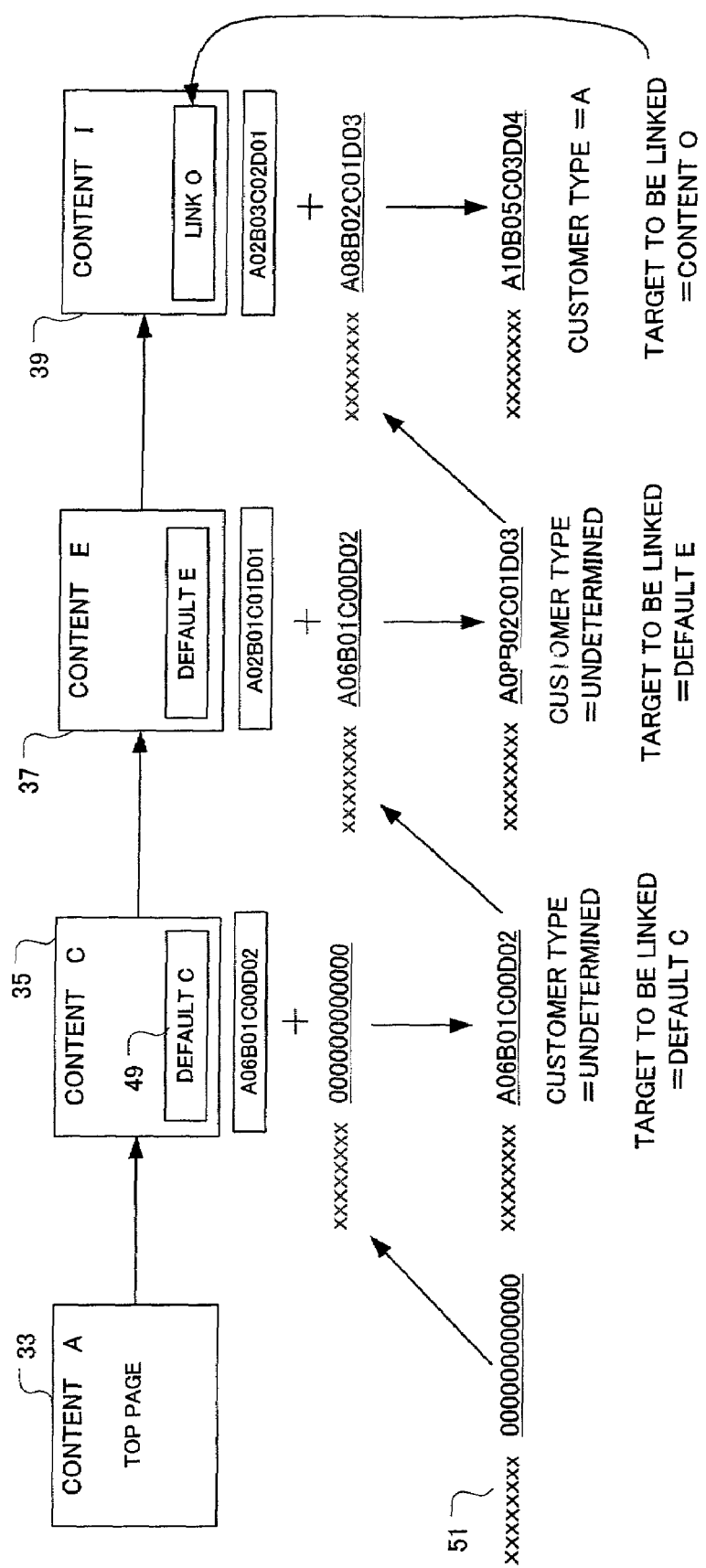
FIG. 7 shows a transit of the user ID in accordance with the user's accesses.

FIG. 6 is a flowchart showing the process of the Web server 13, and FIG. 7 shows transition of the user ID in response to the user's access. Following will describe a process of the Web server 13 for determining the customer type, with reference to FIG. 6 and FIG. 7.

In FIG. 7, the content A 33 is first shown as a top page in the browser screen in the PC 11. At this time, the customer type identification portion of the user ID 51 is initialized as "000,000,000,000".

When the user selects, at the top page, a link to the content C, the request for the content C is transmitted to the Web server 13 by the PC 11 (step 101 of FIG. 6). When the Web server 13 receives the request for the content C from the PC 11, the customer type identification data "A06,B01,C00, D02" which is associated with the content C is retrieved (step 103 of FIG. 6). Then, the retrieved customer type identification data of the content C is added to the customer type identification portion of the user ID 51 ("000,000,000, 000"+"A06,B01,C00,D02"="A06,B01,C00,D02"). As a result, the customer type identification portion of the user ID 51 is updated to be "A06, B01,C00,D02" (step 105 of FIG. 6). The updated customer type identification portion of the user ID 51 is compared with a predetermined reference value. If the customer type identification portion exceeds the reference value, the customer type of the user is determined (step 107 of FIG. 6).

In the example of FIG. 7, the predetermined reference value is "10". Accordingly, unless either of the customer type coefficients (numerical value following each alphabet) of the customer type identification portion becomes "10" or more, determination of the customer type of the user is not performed. Therefore, the determination of the user's customer type is not carried out immediately after the request for the content C.

When the determination of the customer type is not performed, the link to the target of the dynamic link area 49 is set to a predetermined default link to the target (step 113 of FIG. 6). After the dynamic link area 49 has been set to the default, the Web server 13 transmits the content C 35 and the default link to the PC 11 (step 115 of FIG. 6), so that the contents C 35 and the default link are displayed on the browser screen 53 of the PC 11.

Subsequently, when the user clicks a link to the content E in the content C 35, the Web server 13 receives a request for the content E 37 (step 101). When the Web server 13 receives the request for the content E 37 from the PC 11, the customer type identification data "A02, B01,C01,D01" which is associated with the content E 37 is retrieved (step 103). Then, the retrieved customer type identification data of the content E is added to the customer type identification portion of the user ID 51 ("A06,B01,C00,D02"+"A02,B01, C01,D01"="A08,B02,C01,D03"), so that the customer type identification portion of the user ID 51 is updated to be "A08,B02,C01,D03" (step 105).

In this instance again, just as in the previous instance, none of the customer type coefficients of the client type identification portion exceeds "10". Accordingly, the user's customer type is not determined (step 107) and the link in the dynamic link area 49 is set to the default target (step 113). After the dynamic link area 49 has been set to the default, the Web server 13 transmits the content E 37 and the default link to the PC 11 (step 115), so that the contents E 37 and the default link are displayed on the browser screen 53 of the PC 11.

Then, when the user clicks a link to the content I in the content E 37, the Web server 13 receives a request for the content I 39 (step 101). In response, the customer type identification data "A02,B03,C02,D01" assigned to the content I 39 are retrieved (step 103). Then, the retrieved customer type identification data of the content I is added to the customer type identification portion of the user ID 51 ("A08,B02,C01,D03"+"A02,B03,C02,D01"="A10,B05, C03,D04"), so that the customer type identification portion of the user ID 51 is updated to be "A10,B05,C03,D04" (step 105).

In this instance, the determination of the customer type is performed because the customer type coefficient of A in the customer type identification is not less than "10" (step 109). In this embodiment, the user's customer type is determined from the largest customer type coefficient in the customer type identification data. The customer type identification portion in the user ID which has been updated immediately after the request for the content I 39 is "A10,B05,C03,D04", indicating the sequence of the customer type coefficients is A>B>D>C. Therefore, the customer type for this user is determined as type A, that is, the type of "need for person dependency" (step 109).

After the customer type for this user has been determined as the type of "need for person dependency", the link in the dynamic link area 49 is set to the target corresponding to the type of "need for person dependency" (step 113). As for the example in FIG. 7, the link to the target corresponding to the type of "need for person dependency" is assumed to be "content O". So, the link to the target of the dynamic link area 49 is set to "content O". Then, the Web server 13 transmits the content I 39 as well as the link to the content O to the PC 11 (step 115), so that the content I 39 and the link to the content O are displayed on the browser screen 53 of the PC 11.

For every content request by the user, the Web server 13 retrieves the customer type identification data 45 associated with the requested content and updates the customer type identification portion of the user ID based on the retrieved customer type identification data 45. The customer type for the user is determined based on the updated customer type identification portion. Once the customer type for the user has been determined, a link to the content corresponding to that customer type is obtained. The Web server 13 transmits the requested content together with the link to the content corresponding to the customer type, to the PC 11 so as to present them to the user.

Such process for determining the user's customer type does not need to store access logs for individual users in the Web server. Rather, it is sufficient to store only the user ID which contains the person identification portion and the customer type identification portion. Because the data amount of the user ID is less than the access log and only the user ID needs to be updated for every content request, the storage area requirement for the system can be decreased.

Besides, the determination process for the customer type according to the present invention is based on the update of the customer type identification portion for every content request and the determination of the customer type identification portion after the update. Because the processing cost for these processes for every content request is relatively small, the determination of the customer type can be processed in real time without decreasing the overall throughput of the Web site.

In the above-described embodiment, the customer type identification portion of the user ID is updated by means of adding the retrieved customer type identification data 45. However, in an alternative embodiment, the customer type identification portion is updated in accordance with a stochastic matrix.

In case of using the stochastic matrix to update the customer type identification portion, a default matrix is first given as an initial value. When a user accesses a content, the customer type identification data 45 associated with the content is retrieved. The stochastic matrix of the content is created from the retrieved customer type identification data 45. Then, the default matrix is multiplied by the stochastic matrix created from the content. The multiplication result is substituted for the customer type identification portion. Every time the user accesses a new content, a stochastic matrix is created from the customer type identification portion, and the created stochastic matrix is multiplied by the stochastic matrix created from the content. The customer type identification portion is updated through repeating these matrix operations. Such updated customer type identification portion is compared with a reference value so as to determine the customer type in the same manner as for the aforementioned addition method.

In the above-described embodiment, the dynamic link area is provided in the Web page that is frame-divided. In another embodiment, however, a link in the Web page which is being accessed can dynamically select a content for presenting an appropriate Web page. In such embodiment, a content corresponding to the customer type, not a link appropriate to the user according to the customer type, is presented. Following will describe another embodiment with reference to FIG. 8.

In another embodiment, multiple versions are prepared for one content. Each of the multiple versions contains respective information which is slightly different for each customer type. A version of the content corresponding to the customer type is presented as a Web page when the customer type of the user has been determined.

Figure 8:
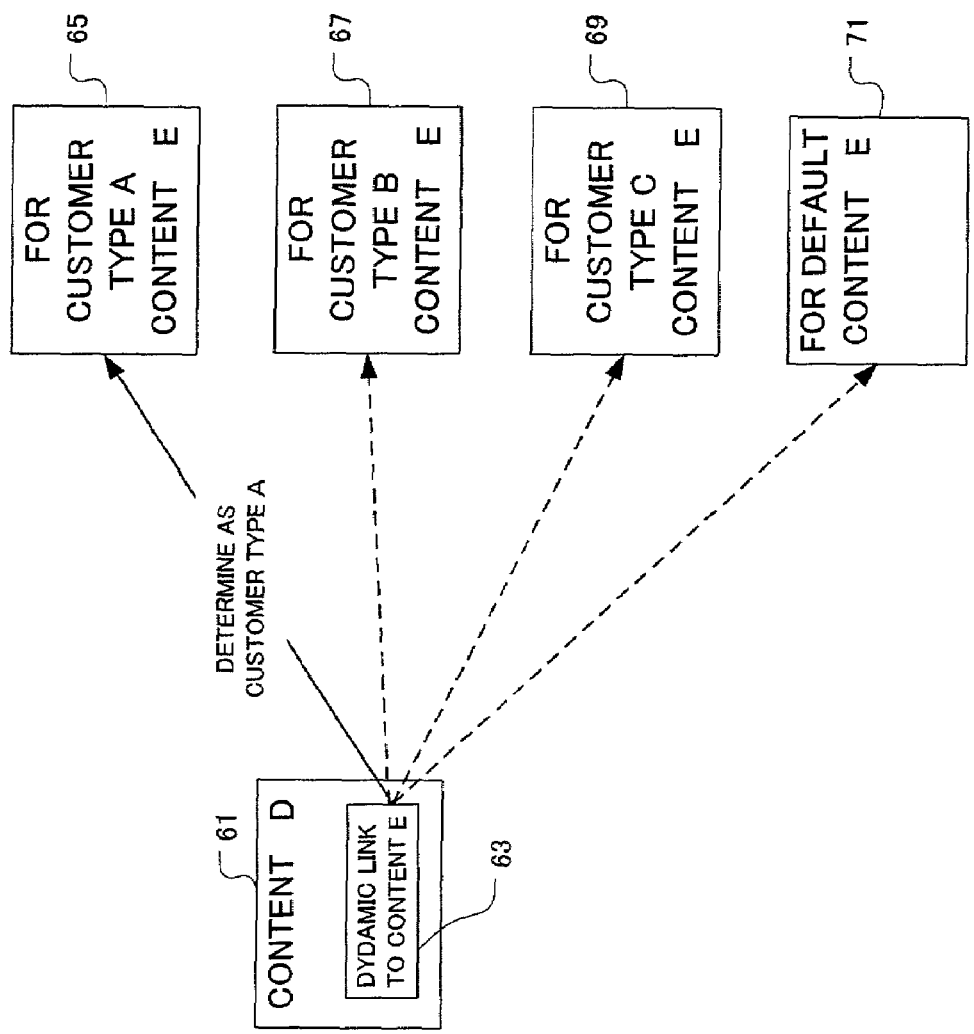
FIG. 8 shows an embodiment for providing content versions in accordance with customer types.

For example, the content D 61 shown in FIG. 8 contains a dynamic link 63 to the content E. Although this dynamic link 63 displayed on the browser screen appears as if the URL of the content E were its target to be linked, it is actually linked to the URL of the CGI program.

When this dynamic link 63 is clicked by the user, a parameter representing the content E is transmitted by the PC 11 to the CGI program. The parameter representing the content E is used as an argument for selecting the content to be transmitted to the PC 11.

The Web server 13 prepares beforehand multiple versions of the content E (65 to 71) corresponding to the customer types. These multiple versions essentially have the same information as the content E but have some differences in accordance with the customer types. Just as content E, these content versions are provided with customer type identification data.

The CGI program selects, from these versions, a version of the content E which is most appropriate to the user. In order to make this selection, the CGI program retrieves the customer type identification data associated with the content E so as to determine the customer type based on the retrieved customer type identification data.

When it is determined that the type of the user is the customer type A, the CGI program selects the content E 65 for the customer type A to transmit it to the PC 11. When the customer type B is determined, the CGI program selects the content E 67 for the customer type B to transmit it to the PC 11. When the customer type is not determined, the CGI program selects the content E 71 for the default type to transmit it to the PC 11. Thus, the CGI program selects a version of the content E corresponding to the customer type and transmits it to the PC 11.

Such provision of the contents corresponding to the customer types is not limited to the above-described embodiments. In the above-described embodiment, multiple versions of the content, according to the customer types, are beforehand prepared in the Web page. Alternatively, for example, one content version may be generated based on the customer type every time the customer type is determined.

Although the invention has been above described with reference to the specific embodiments, the invention is not limited to such embodiments and various modifications that may be easily implemented by skilled persons in the art are within the scope of the present invention.

What is claimed is:

1. A computer system which is related with a Web server for providing a Web site with a Web page over the Internet, contents of the Web page being previously provided with numerical data for customer type identification, the computer system comprising:

a user ID storage for storing user IDs comprising a personal identification portion for identifying a user and a customer type identification portion for identifying a user type; and a contents storage for storing contents in association with the numerical data for customer type identification of the contents, wherein the computer system is programmed to read out the numerical data for customer type identification of contents from the contents storage when a user requests the contents, to perform operations on the numerical data for customer type identification to update a value of the customer type identification portion of the user ID of the user based on said user requested contents, to store the updated customer type identification portion in the user ID storage, to select a customer type from a predetermined number of possible customer types based on the updated value of the customer type identification portion of the user ID of the user who has requested the contents and to dynamically set a link to contents to be supplied to the user, depending on the selected customer type.

2. The computer system according to claim 1, wherein the provided Web page contains at least two frames on the browser screen;

wherein the contents requested by the user are displayed in a first frame of the browser screen; and wherein the link dynamically set is displayed in a second frame of the browser screen.

3. The computer system according to claim 1, wherein the customer type identification portion of a user ID contains codes representing a plurality of customer types and customer type coefficients representing relationships between the user of the user ID and each of the customer types and the customer type identification data contain coefficients representing relationships between the contents and the plurality of customer types and the customer type coefficients contained in the customer type identification portion of the user ID and the coefficients associated with the contents which the user has requested are added to update the customer type identification portion.

4. A method for providing a Web site with a Web page over the Internet, by a computer system, contents of the Web page being previously provided with numerical data for customer type identification, the computer system comprising:

a user ID storage for storing user IDs comprising a personal identification portion for identifying a user and a customer type identification portion for identifying a user type; and a contents storage for storing contents in association with the numerical data for customer type identification of the contents, wherein the method comprising the steps of:

reading out the numerical data for customer type identification of contents from the contents storage when a user requests the content;

performing operations on the numerical data for customer type identification to update a value of the customer type identification portion of the user ID of the user based on said user requested contents;

storing the updated customer type identification portion in the user ID storage;

selecting a customer type from a predetermined number of possible customer types based on the updated value of the customer type identification portion of the user ID of the user who has requested the content; and dynamically setting a link to contents to be supplied to the user, depending on the selected customer type.

5. The method according to claim 4, wherein the provided Web page contains at least two frames on the browser screen;

wherein the contents requested by the user are displayed in a first frame of the browser screen; and wherein the link dynamically set is displayed in a second frame of the browser screen.

6. The method according to claim 4, wherein the customer type identification portion of a user ID contains codes representing a plurality of customer types and customer type coefficients representing relationships between the user of the user ID and each of the customer types and the customer type identification data contain coefficients representing relationships between the contents and the plurality of customer types and the customer type coefficients contained in the customer type identification portion of the user ID and the coefficients associated with the contents which the user has requested are added to update the customer type identification portion.

* * * * *